United States Patent Office 3,468,619
Patented Sept. 23, 1969

3,468,619
METHINE DYESTUFFS
Roderich Raue and Hans-Peter Kühlthau, Leverkusen, Germany, assignors to Farbenfabriken Bayer Aktiengesellschaft, Leverkusen, Germany, a corporation of Germany
No Drawing. Filed Oct. 12, 1965, Ser. No. 495,317
Claims priority, application Germany, Oct. 24, 1964, F 44,311; May 12, 1965, F 46,026
Int. Cl. D06p 3/04
U.S. Cl. 8—25                                    19 Claims

ABSTRACT OF THE DISCLOSURE

Dyestuffs having superior wash fastness on polyamide fibers of the formula:

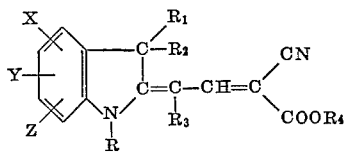

in which R, $R_1$ and $R_2$ are lower alkyl, $R_3$ is H or —CH, $R_4$ is phenyl lower alkyl, which may be substituted, phenyl lower oxyalkyl or phenyl alkenyl, and X, Y, and Z are hydrogen, lower alkyl, lower alkoxy, halo, amino, nitro cyano, carbo lower alkoxy, carbophenyloxy alkyl sulfonyl, phenyl sulfonyl carboxamide or substituted carboxamide.

---

The present invention relates to novel methine dyestuffs; more particularly it relates to sulphonic acid group free methine dyestuffs of the formula

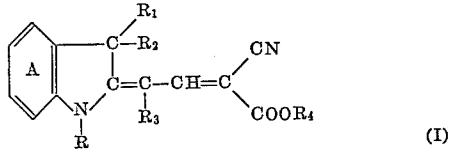

in the formula $R_1$ and $R_2$ independently represent alkyl, aralkyl or cycloalkyl radicals; R stands for hydrogen or alkyl, aralkyl or aryl; $R_3$ stands for hydrogen, —CN, a carboxylic acid amide, carboxylic acid alkylamide or carboxylic acid ester group, $R_4$ stands for aralkyl, aroxyalkyl or aralkenyl linked to —O— via the alkyl or alkenyl group; the ring A as well as the radicals R to $R_4$ may have further substituents other than sulphonic acid groups.

The invention further relates to mixtures of dyestuffs of Formula I with methine dyestuffs of the formula

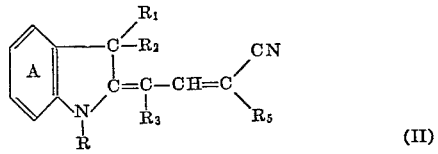

wherein $R_1$ and $R_2$, R and $R_3$ have the same meaning as indicated above and $R_5$ stands for —CN or an optionally substituted carboxylic acid amide or carboxylic acid ester group where in the case that $R_5$ denotes a carboxylic acid ester group this differs from the radical $COOR_4$ of Formula I; in Formula II the ring A and the radicals R, $R_1$, $R_2$, $R_3$ and $R_5$ may have other substituents except for sulphonic acid groups.

The novel methine dyestuffs of Formula I are obtained when a 2-methylene-indolene-ω-aldehyde disubstituted at the 3-position by alkyl, cycloalkyl or aralkyl radicals, which may exhibit an alkyl, aralkyl or aryl radical at the 1-position, which may have a cyano, carboxylic acid amide, carboxylic acid alkylamide or carboxylic acid ester group on the carbon atom of the 2-methylene group in addition to the aldehyde group, and which may have further substituents, is condensed with cyanoacetic acid aralkyl esters, aroxyalkyl esters or aralkenyl esters, preferably in an alkaline medium when the starting components are selected to be free from sulphonic acid groups.

The reaction of the starting components is carried out in the presence or absence of a solvent or diluent with the addition of a catalyst which should preferably be alkaline. Suitable solvents or diluents are those which exhibit inert behaviour under the conditions of the condensation reaction and which are capable of dissolving a sufficient quantity of the reaction partners. Methanol, ethanol, dioxane, carbon tetrachloride, chlorobenzene and toluene are for instance suitable for application.

Suitable alkaline condensation agents are, inter alia, pyridine, diethylamine, potassium hydroxide, sodium hydroxide and especially piperidine.

The reaction can be carried out in the presence of an emulsifying agent, such as the condensation product of oleyl alcohol with 20 moles of ethylene oxide, in order to allow the dyestuff to be separated in a finely divided form.

For the preparation of the dyestuff, the starting components are condensed, for instance by heating the alcoholic solution or suspension of the reaction partners under reflux with the addition of piperidine. In addition to the substituents specified at the 1- and 3-position, the aldehyde components from the indolene series may also have other substituents in the aromatic nucleus of the indolene, such as alkyl, alkoxy, halogen, nitro, acetyl, carbalkoxy, carboxylic acid amide, carboxylic acid alkylamide, sulphonamide, sulphoalkylamide, sulphoarylide, alkylsulphonyl, cyano, amino, alkylamino, arylamino and acylamino groups. It has already been mentioned that they may also exhibit a cyano group, carboxylic acid amide, carboxylic acid alkylamide and carboxylic acid ester group on the carbon atom of the methylene group at the 2-position, this group being introduced by methods known per se, for instance by the action of cyanogen chloride, isocyanate or chloroformic acid ester on the aldehyde component.

Suitable aldehyde components are, for instance, the following compounds:

1,3,3-trimethyl-2-methylene-indolene-ω-aldehyde;
1-ethyl-3,3-dimethyl-2-methylene-indolene-ω-aldehyde;
1,3,3,5-tetramethyl-2-methylene-indolene-ω-aldehyde;
1,3,3-trimethyl-5-halogeno-2-methylene-indolene-ω-aldehyde;
1,3,3-trimethyl-5-nitro-2-methylene-indolene-ω-aldehyde;
1,3,3,7-tetramethyl-5-nitro-2-methylene-indolene-ω-aldehyde;
1,3,3-trimethyl-5-alkoxy-2-methylene-indolene-ω-aldehyde;

alkyl esters such as the methyl, ethyl and benzyl esters as well as amides of 1,3,3-trimethyl-5-carboxylic acid-2-methylene-indolene-ω-aldehyde;
1-ethyl-3,3-dimethyl-5-ethoxy-2-methylene-indolene-ω-aldehyde;
1-ethyl-3,3-dimethyl-5-carboxylic acid-2-methylene-indolene-ω-aldehyde ethyl ester;
1,3,3-trimethyl-5-cyano-2-methylene-indolene-ω-aldehyde;
1,3,3-trimethyl-5-acylamino-2-methylene-indolene-ω-aldehyde;

1,3,3-trimethyl-5-amino-2-methylene-indolene-ω-
  aldehyde;
1,3,3-trimethyl-5-alkylsulphonylamino- or -arylsulponyl-
  amino-2-methylene-indolene-ω-aldehyde;
1,3,3-triethyl-2-methylene-indolene-ω-aldehyde;
1,3,3-trimethylbenzo-(6,7)-2-methylene-indolene-ω-
  aldehyde;
1,3,3-trimethylbenzo-(4,5)-2-methylene-indolene-ω-
  aldehyde;
1,3,3-trimethyl-5-sulphonamido- and -alkylsulphonamido-
  2-methylene-indolene-ω-aldehyde;
1,3,3-trimethyl-5-methylsulphonyl-2-methylene-indolene-
  ω-aldehyde and
1,3,3-trimethyl-5-methoxy-2-methylene-indolene-ω-
  cyano-ω-aldehyde.

The following compounds may be employed as the cyanoacetic acid aralkyl, aroxyalkyl and aralkenyl esters:

Cyanoacetic acid benzyl esters, cyanoacetic acid 2-chlorobenzyl ester, cyanoacetic acid 4-chlorobenzyl ester, cyanoacetic acid 3,4-dichlorobenzyl ester, cyanoacetic acid 2,4,6-trichlorobenzyl ester, cyanoacetic acid 4-nitrobenzyl ester, cyanoacetic acid 4-methylbenzyl ester, cyanoacetic acid α-phenylethyl ester, cyanoacetic acid β-phenylethyl ester, cyanoacetic acid β-hydroxy-β-phenylethyl ester, cyanoacetic acid γ-phenylpropyl ester, cyanoacetic acid γ-phenylallyl ester and cyanoacetic acid phenoxyethyl ester.

The dyestuffs can be employed for dyeing according to the usual methods, from an aqueous dispersion or again by adding them to the spinning compositions prior to the spinning process during the production of synthetic fibres. Brilliant dyeings characterized by excellent fastness to light are obtained on the specified materials. The dyestuffs obtainable according to the process exhibit a better fastness towards washing when dyed on superpolyamide fibres compared with the most closely related dyestuffs of British patent specification No. 929,393.

The novel dyestuffs are valuable products on their own as individual dyestuffs and again in the form of mixtures of at least two different dyestuff of Formula I or in the form of at least one dystuff of Formula I with at least one other methine dyestuff. Mixtures of at least one novel methine dyestuff of the formula

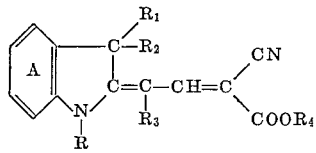

(I)

and at least one different methine dyestuff

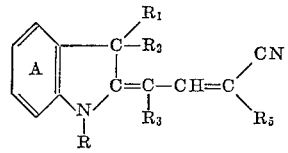

(II)

wherein $R_1$ and $R_2$ denote alkyl, aralkyl or cycloalkyl radicals, R is hydrogen, an alkyl, aralkyl or aryl radical, $R_3$ is hydrogen, a cyano, carboxylic acid amide, carboxylic acid alkylamide or carboxylic acid ester group, $R_4$ is an aralkyl, aroxyalkyl or aralkenyl radical linked to —O— via the alkyl or alkenyl group, and $R_5$ is a cyano, carboxylic acid ester or optionally substituted carboxylic acid amide group, where the ring A and the radicals R–$R_5$ may have other substituents, except for sulphonic acid groups, have proved to be particularly valuable.

In the case where $R_5$ represents a carboxylic acid ester group, this must be different from the group —$COOR_4$ in Formula I according to the definition.

Mixtures of (I) and (II) of this type are obtained when a 2-methylene-indolene-ω-aldehyde disubstituted at the 3-position by alkyl, cycloalkyl or aralkyl radicals which may exhibit an alkyl, aralkyl or aryl radical at the 1-position and in addition to the aldehyde group a cyano group, carboxylic acid amide, carboxylic acid alkylamide or carboxylic acid ester group on the carbon atom of the methylene group at the 2-position and which may have other substituents, is condensed with a cyanoacetic acid ester of the formula

(III)

and at the same time with a different cyanoacetic acid derivative of the formula

(IV)

preferably in an alkaline medium, when the starting components are selected to be free from sulphonic acid groups.

The reaction of the starting components is carried out in the presence or absence of a solvent or diluent with the addition of a catalyst which should preferably be alkaline. Suitable solvents or diluents are those which exhibit inert behaviour under the conditions of the condensation reaction and which are capable of dissolving a sufficient quantity of the reaction partners. The other reaction conditions are also fundamentally the same as those employed for the preparation of the individual dyestuffs (I).

In addition to the cyanoacetic acid aralkyl, aroxyalkyl and aralkenyl esters of Formula III mentioned above suitable cyanoacetic acid derivatives of Formula IV also, for instance, include malonic acid dinitrile, cyanoacetic acid methyl ester, cyanoacetic acid ethyl ester, cyanoacetic acid isobutyl ester, cyanoacetic acid 3-methoxybutyl ester, cyanoacetic acid isoamyl ester, cyanoacetic acid cyclohexyl ester, cyanoacetic acid p-methylcyclohexyl ester, cyanoacetic acid tetrahydrofurfuryl ester, cyanoacetic acid methyl ester, cyanoacetic acid dichloroisopropyl ester, cyanoacetic acid N-methylamide, cyanoacetic acid N-ethylamide, cyanoacetic acid N-butylamide, cyanoacetamide, cyanoacetic acid N-methylanilide, cyanoacetic acid N-ethylanilide, cyanoacetic acid β-hydroxyethylamide, cyanoacetic acid γ-methoxypropylamide, and cyanoacetic acid β-cyanoethyl ester.

A particular advantage of the dyestuff mixtures, in comparison with the individual dyestuffs some of which are known, consists in that the mixtures are obtained in a finely divided form even when no emulsifying agents are added to the reaction medium, and that moreover they can afterwards be converted to the dispersed form required for dyeing with appreciably less expenditure of work. Moreover, the dyestuff mixtures take better on synthetic fibre materials, and in particular on aromatic polyesters, such as polyethylene terephthalate and polyesters from terephthalic acid and 1,4-bis-hydroxymethyl-cyclohexane, and on synthetic superpolyamides than the individual dyestuffs.

The dyestuff mixtures can be employed for dyeing according to the usual methods, from an aqueous dispersion or again by adding them to the spinning compositions prior to the spinning process during the production of synthetic fibres. Brilliant dyeing characterised by excellent fastness to light are obtained on the specified materials. The dyestuff mixtures obtainable according to the process exhibit a better fastness to water when dyed on superpolyamide fibres compared with the most closley related dyestuffs of British Patent No. 929,393.

The novel dyestuff mixtures contain at least two different dyestuffs of Formulas I and II, and in the case where $R_5$ is a carboxylic acid ester group this must be different from —$COOR_4$. An example of this last mentioned instance is provided when —$COOR_4$ in Formula I is a carboxylic acid benzyl ester group and the radical $R_5$ in Formula II is a carboxylic acid γ-phenylpropyl ester group.

In the following examples, given for the purpose of illustrating the invention, the specified parts by weight are related to the parts by volume in the proportion of grams to millilitres; the temperature indications are given in degrees centigrade.

EXAMPLE 1

25.9 parts by weight of 1,3,3-trimethyl-5-carbomethoxy-2-methylene-indolene-ω-aldehyde and 17.6 parts by weight of cyanoacetic acid benzyl ester are heated at 90° C. in 60 parts by volume of dioxane, when the major fraction of the aldehyde dissolves. 0.5 parts by volume of piperidine are thereafter added dropwise and the reaction mixture is maintained a little longer at a temperature of about 90° C. A clear solution is formed after a few minutes, and this is stirred for 2 hours whilst gently boiling under reflux.

The dyestuff crystallises out on cooling. The yield becomes almost quantitative when the mixture is treated with 60 parts by volume of methanol and cooled to 0° C. The dyestuff is filtered off with suction and washed with methanol (M.P. 177–178° C.).

20 parts by weight of the resultant dyestuff are kneaded with 80 parts by weight of a formaldehyde/naphthalene-sulphonic acid condensation product and a little water until the dyestuff is present in a finely divided state. The pulp is dried in vacuo at 50° C.

A yarn of ε-caprolactam polymer is introduced at 50° C. into a dye liquor which contains, per litre, 0.66 g. of the dyestuff dispersion prepared by the method mentioned above as well as 0.5 g. of a formaldehyde/naphthalene-sulphonic acid condensation product. The liquor-to-goods ratio amounts to 35:1. The liquor is heated to 100° C. within half an hour and dyeing is carried out at this temperature for 1 hour. The yarn is thereafter rinsed and dried. A greenish yellow dyeing with excellent fastness to light is obtained. Similar results are achieved when the above described compound is replaced by the dyestuffs obtained from the starting components listed in the following table:

| Aldehyde component | Methylene compound | Melting point of dyestuff (° C.) |
|---|---|---|
| 1,3,3-trimethyl-5-carbomethoxy-2-methylene-indolene-ω-aldehyde | Cyanoacetic acid benzyl ester | 177–178 |
| Do | Cyanoacetic acid 2-chlorobenzyl ester | 192–194 |
| Do | Cyanoacetic acid 4-chlorobenzyl ester | 224–225 |
| Do | Cyanoacetic acid 4-methylbenzyl ester | 209–210 |
| Do | Cyanoacetic acid α-phenylethyl ester | 167 |
| Do | Cyanoacetic acid β-phenylethyl ester | 175–176 |
| Do | Cyanoacetic acid 3,4-dichlorobenzyl ester | 241–243 |
| Do | Cyanoacetic acid γ-phenylallyl ester | 202–203 |
| Do | Cyanoacetic acid γ-phenylpropyl ester | 148–149 |
| Do | Cyanoacetic acid trichlorobenzyl ester | 234–237 |
| Do | Cyanoacetic acid β-phenoxyethyl ester | 166–168 |
| Do | Cyanoacetic acid 4-nitrobenzyl ester | 253–254 |
| Do | Cyanoacetic acid β-hydroxy-β-phenyl ethyl ester | 162 |
| 1,3,3-trimethyl-2-methylene-indolene-ω-aldehyde | Cyanoacetic acid benzyl ester | 109–111 |
| Do | Cyanoacetic acid γ-phenylpropyl ester | 111 |
| 1,3,3-trimethyl-5-methoxy-2-methylene-indolene-ω-aldehyde | Cyanoacetic acid benzyl ester | 171 |
| Do | Cyanoacetic acid γ-phenylpropyl ester | 190 |
| 1,3,3-trimethyl-5-methoxy-2-methylene-ω-cyanoindolene-ω-aldehyde | Cyanoacetic acid benzyl ester | 157 |
| Do | Cyanoacetic acid γ-phenylpropyl ester | 128 |
| 1,3,3,5-tetramethyl-2-methylene-indolene-ω-aldehyde | Cyanoacetic acid benzyl ester | 190 |
| Do | Cyanoacetic acid γ-phenylpropyl ester | 184–185 |
| 1,3,3-trimethyl-5-carbamido-2-methylene-indolene-ω-aldehyde | Cyanoacetic acid benzyl ester | 211 |
| 1,3,3-trimethyl-5-carboethoxy-2-methylene-indolene-ω-aldehyde | do | 163 |
| 1,3,3-trimethyl-5-nitro-2-methylene-indolene-ω-aldehyde | do | 251 |
| 1,3,3-trimethyl-5-cyano-2-methylene-indolene-ω-aldehyde | do | 208 |
| Do | Cyanoacetic acid γ-phenylpropyl ester | 209 |
| 1,3,3-trimethyl-5-methylsulphonyl-2-methylene-indolene-ω-aldehyde | Cyanoacetic acid benzyl ester | 208 |
| 1,3,3-trimethyl-5-carbobenzoxy-2-methylene-indolene-ω-aldehyde | do | 160 |
| Do | Cyanoacetic acid γ-phenylpropyl ester | 176 |
| 1,3,3-trimethyl-5-(-N-ethyl)-carbanilido-2-methylene-indolene-ω-aldehyde | Cyanoacetic acid benzyl ester | 146 |
| 1,3,3-trimethyl-5-phenylsulphonyl-2-methylene-indolene-ω-aldehyde | do | 208 |
| Do | Cyanoacetic acid γ-phenylpropyl ester | 161 |
| 1,3,3,7-tetramethyl-5-nitro-2-methylene-indolene-ω-aldehyde | Cyanoacetic acid benzyl ester | 205 |
| 1,3,3-trimethyl-5-chloro-2-methylene-indolene-ω-aldehyde | do | 209 |
| Do | Cyanoacetic acid γ-phenylpropyl ester | 198–199 |
| 1,3,3-trimethyl-5-ethoxy-2-methylene-indolene-ω-aldehyde | Cyanoacetic acid benzyl ester | 175–176 |
| Do | Cyanoacetic acid γ-phenylpropyl ester | 149–152 |
| 1,3,3-trimethyl-5-methoxy-2-methylene-indolene-ω-aldehyde | Cyanoacetic acid 4-chlorobenzyl ester | 196–197 |
| 1,3,3-trimethyl-7-ethyl-2-methylene-indolene-ω-aldehyde | Cyanoacetic acid benzyl ester | 125–127 |
| Do | Cyanoacetic acid γ-phenylpropyl ester | 99–101 |
| 1,3,3,7-tetramethyl-2-methylene-indolene-ω-aldehyde | Cyanoacetic acid benzyl ester | 134 |
| Do | Cyanoacetic acid γ-phenylpropyl ester | 155 |
| 1,3,3,5-tetramethyl-2-methylene-indolene-ω-aldehyde | Cyanoacetic acid 4-chlorobenzyl ester | 196–197 |
| 1,3,3-trimethyl-5-amino-2-methylene-indolene-ω-aldehyde | Cyanoacetic acid benzyl ester | 200 |
| 1,3,3,7-tetramethyl-5-nitro-2-methylene-indolene-ω-aldehyde | Cyanoacetic acid 4-nitrobenzyl ester | 242 |
| 1,3,3-trimethyl-5-methoxy-2-methylene-indolene-ω-aldehyde | Cyanoacetic acid 2-chlorobenzyl ester | 174–176 |
| 1,3,3,7-tetramethyl-2-methylene-indolene-ω-aldehyde | do | 201 |
| Do | Cyanoacetic acid 3,4-dichlorobenzyl ester | 193 |
| Do | Cyanoacetic acid 2,4,6-trichlorobenzyl ester | 197 |
| 1,3,3-trimethyl-5-methoxy-2-methylene-ω-cyanoindolene-ω-aldehyde | Cyanoacetic acid 2-chlorobenzyl ester | 203–205 |
| Do | Cyanoacetic acid 4-chlorobenzyl ester | 198 |
| Do | Cyanoacetic acid 3,4-dichlorobenzyl ester | 199 |
| 1,3,3-trimethyl-5-nitro-2-methylene-indolene-ω-aldehyde | do | 203 |
| 1,3,3-trimethyl-7-ethyl-2-methylene-indolene-ω-aldehyde | Cyanoacetic acid 2-chlorobenzyl ester | 185 |
| 1,3,3-trimethyl-7-ethoxy-2-methylene-indolene-ω-aldehyde | do | 198 |
| 1,3,3-trimethyl-5-methoxy-2-methylene-indolene-ω-aldehyde | Cyanoacetic acid 2,4,6-trichlorobenzyl ester | 217 |
| 1,3,3-trimethyl-5-methoxy-2-methylene-ω-cyanoindolene-ω-aldehyde | do | 193 |
| 1,3,3,5-tetramethyl-2-methylene-indolene-ω-aldehyde | do | 204 |
| 1,3,3-trimethyl-5-carbo-γ-phenyl-propoxy-2-methylene-indolene-ω-aldehyde | Cyanoacetic acid benzyl ester | 155 |
| Do | Cyanoacetic acid γ-phenylpropyl ester | 115 |
| 1,3,3,7-tetramethyl-5-chloro-2-methylene-indolene-ω-aldehyde | Cyanoacetic acid benzyl ester | 211 |
| Do | Cyanoacetic acid γ-phenylpropyl ester | 161 |
| 1,3,3,7-tetramethyl-4-chloro-2-methylene-indolene-ω-aldehyde | Cyanoacetic acid benzyl ester | 170 |
| Do | Cyanoacetic acid γ-phenylpropyl ester | 173 |
| 1,3,3,7-tetramethyl-6-chloro-2-methylene-indolene-ω-aldehyde | Cyanoacetic acid benzyl ester | 181 |
| Do | Cyanoacetic acid γ-phenylpropyl ester | 166 |
| 1,3,3-trimethyl-5-chloro-7-methoxy-2-methylene-indolene-ω-aldehyde | Cyanoacetic acid benzyl ester | 230 |
| Do | Cyanoacetic acid γ-phenylpropyl ester | 151 |
| 1,3,3-trimethyl-4-chloro-7-methoxy-2-methylene-indolene-ω-aldehyde | Cyanoacetic acid benzyl ester | 151 |
| Do | Cyanoacetic acid γ-phenylpropyl ester | 118 |
| 1,3,3,7-tetramethyl-4-carbomethoxy-2-methylene-indolene-ω-aldehyde | Cyanoacetic acid benzyl ester | 195 |
| Do | Cyanoacetic acid γ-phenylpropyl ester | 250 |
| 1,3,3-trimethyl-5-methoxy-2-methylene-ω-cyanoindolene-ω-aldehyde | Cyanoacetic acid γ-phenylallyl ester | 129 |

| Aldehyde component | Methylene compound | Melting point of dyestuff (° C.) |
| --- | --- | --- |
| 1,3,3-trimethyl-5-methoxy-2-methylene-ω-cyanoindolene-ω-aldehyde | Cyanoacetic acid phenoxyethyl ester | 154 |
| 1,3,3-trimethyl-4,6-dicarbomethoxy-2-methylene-indolene-ω-aldehyde | Cyanoacetic acid benzyl ester | 205 |
| Do | Cyanoacetic acid γ-phenylpropyl ester | 162 |
| 1,3,3-trimethyl-4,5-dichloro-7-methoxy-2-methylene-indolene-ω-aldehyde | Cyanoacetic acid benzyl ester | 191–192 |
| Do | Cyanoacetic acid γ-phenylpropyl ester | 146–148 |
| 1,3,3-trimethyl-5-chloro-4,7-dimethoxy-2-methylene-indolene-ω-aldehyde | Cyanoacetic acid benzyl ester | 143 |
| Do | Cyanoacetic acid γ-phenylpropyl ester | 144 |
| 1,3,3,4-tetramethyl-5-chloro-7-methoxy-2-methylene-indolene-ω-aldehyde | Cyanoacetic acid benzyl ester | 199–200 |
| Do | Cyanoacetic acid γ-phenylpropyl ester | 141 |

EXAMPLE 2

7 parts by weight of 1,3,3-trimethyl-5-methoxy-2-methylene-indolene-ω-cyano-ω-aldehyde and 4.8 parts by weight of cyanoacetic acid benzyl ester are heated at 90° C. in 15 parts by volume of dioxane, when the major fraction of the aldehyde dissolves. 0.2 parts by volume of piperidine are thereafter added dropwise and the reaction mixture is maintained a little longer at a temperature of 90° C. A clear solution is formed after a few minutes, and this is stirred at 90–95° C. for 2 hours. The dyestuff crystallises out on cooling.

The yield becomes almost quantitative when the mixture is treated with 30 parts by volume of methanol and cooled to 0° C. The dyestuff is filtered off with suction and washed with methanol (M.P. 157° C.).

100 parts of a fibre material of polyethylene glycol terephthalate are dyed from a liquor containing 2 parts of the resulting dyestuff and 20 parts of a carrier (cresotinic acid ester) in 4000 parts of water, first of all at 80–85° C. for 15–20 minutes and then at its boiling point for 60–90 minutes. A clear greenish yellow dyeing with an excellent fastness to light, washing and sublimation is obtained.

100 parts of a triacetate silk yarn are heated at 98–100° C. for 60 minutes in a dye liquor containing 2 parts of the dyestuff obtained in accordance with the above directions, 4 parts of Marseilles soap and 4000 parts of water. A greenish yellow dyeing with very good fastness to light and wetting is obtained.

Similar good results are obtained during the dyeing of polyester materials and of triacetate materials when for instance 1,3,3 - trimethyl - 5 - methoxy-2-methylene-indolene-ω-cyano-ω-aldehyde and one of the following methylene compounds are selected for preparing the dyestuffs according to Example 2: cyanoacetic acid γ-phenylpropyl ester, cyanoacetic acid 2-chlorobenzyl ester, cyanoacetic acid 4-chlorobenzyl ester, cyanoacetic acid γ-phenylallyl ester and cyanoacetic acid phenoxyethyl ester.

EXAMPLE 3

28.5 parts by weight of 1,3,3-trimethyl-5-carbomethoxy-2-methylene-inodene-ω-aldehyde are heated at 90° C. with (a) 17.6 parts by weight of cyanoactic acid benzyl ester and (b) 2.0 parts by weight of cyanoacetic acid γ-phenylpropyl ester as well as with 60 parts by volume of dioxane, when the major fraction of the aldehyde dissolves. 0.5 parts by volume of piperidine are thereafter added dropwise and the reaction mixture is maintained a little longer at a temperature of about 90° C. A clear solution is formed after a few minutes, and this is stirred for 2 hours whilst gently boiling under reflux.

The dyestuff crystallises out on cooling. The yield becomes almost quantitative when the mixture is treated with 60 parts by volume of methanol and cooled at 0° C. The dyestuff which consists of a mixture of the two esters is filtered off with suction and washed with methanol.

20 parts by weight of the resulting dyestuffs are kneaded with 80 parts by weight of a formaldehyde/naphthalene sulphonic acid condensation product and a little water until the dyestuff is present in a finely divided state. The pulp is dried in vacuo at 50° C.

A yarn of ε-caprolactam polymer is introduced at 50° C. into a dye liquor which contains, per litre, 0.66 g. of the dyestuff dispersion prepared by the method mentioned above as well as 0.5 g. of a formaldehyde/naphthalenesulphonic acid condensation product. The liquor-to-goods ratio amounts to 35:1. The liquor is heated to 100° C. within half an hour and dyeing is carried out at this temperature for 1 hour. The yarn is thereafter rinsed and dried. A greenish yellow dyeing with excellent fastness to light is obtained.

EXAMPLE 4

77.7 parts by weight of 1,3,3-trimethyl-5-carbomethoxy-2-methylene-indolene-ω-aldehyde as well as (a) 20.3 parts by weight of cyanoacetic acid γ-phenylpropyl ester,
(b) 24.4 parts by weight of cyanoacetic acid 3,4-dichlorobenzyl ester and
(c) 27.9 parts by weight of cyanoacetic acid 2,4,6-trichlorobenzyl ester are heated at 90° C. in 180 parts by volume of dioxane, when the major fraction of the aldehyde dissolves. 1.5 parts by volume of piperidine are thereafter added dropwise and the reaction mixture is maintained a little longer at a temperature of about 90° C. A clear solution is formed after a few minutes, and this is stirred for 2 hours whilst gently boiling under reflux.

The resultant dyestuff mixture crystallises out on cooling. The yield becomes almost quantitative when the mixture is treated with 180 parts by volume of methanol and cooled to 0° C. The dyestuff mixture is filtered off with suction and washed with methanol. Dyeings having the same colour shade and the same fastness properties as those in Example 3 are obtained on polyamide fabrics.

EXAMPLE 5

100 parts by weight of 1,3,3-trimethyl-5-carbomethoxy-2-methylene-indolene-ω-aldehyde are added at about 90° C. to the solution of a mixture of cyanoacetic acid derivatives to be described below and 1.7 parts by weight of piperidine are added. The aldehyde dissolves during this operation. It is stirred at 90° C. for 2 hours, cooled to 75° C. and 300 parts by volume of cold methanol are added all at once. The resultant dyestuff mixture is precipitated in a very fine state during this operation. It is cooled to 0° C., filtered off with suction and washed with methanol. Greenish yellow dyeings with very good fastness properties are obtained on polyethylene terephthalate and polyamide fabrics.

The mixture of cyanoacetic acid derivatives was obtained as follows:

180 parts by weight of benzyl alcohol, 10 parts by weight of γ-phenylpropyl alcohol and 60 parts by weight of cyanoacetic acid ethyl ester are mixed by intensive stirring in a three-necked flask provided via a column with a distillation bridge, whilst heating at 145° C. This starts a transesterification reaction of the cyanoacetic acid ethyl ester to produce cyanoacetic acid benzyl ester and cyanoacetic acid γ-phenylpropyl ester, and ethyl alcohol is distilled off.

The temperature is gradually increased to 180° C. The calculated amount of the resulting ethyl alcohol has distilled off after one hour. It is then cooled to 90° C.

Similar dyestuffs are obtained when the above described compound is replaced by the starting components listed in the following table:

| Aldehyde component | Methylene compound | Colour shade of dyestuff mixture on polyamide fabric |
|---|---|---|
| 1,3,3-trimethyl-5-carbomethoxy-2-methylene-indolene-ω-aldehyde | (a) Cyanoacetic acid benzyl ester; (b) Cyanoacetic acid ethyl ester. | Greenish yellow. |
| Do | (a) Cyanoacetic acid 2-chlorobenzyl ester; (b) Cyanoacetic acid benzyl ester. | Do. |
| Do | (a) Cyanoacetic acid 4-chlorobenzyl ester; (b) Cyanoacetic acid benzyl ester. | Do. |
| Do | (a) Cyanoacetic acid 4-methylbenzyl ester; (b) Cyanoacetic acid benzyl ester. | Do. |
| Do | (a) Cyanoacetic acid α-phenylethyl ester; (b) Cyanoacetic acid benzyl ester. | Do. |
| Do | (a) Cyanoacetic acid β-phenylethyl ester; (b) Cyanoacetic acid benzyl ester. | Do. |
| Do | (a) Cyanoacetic acid 3,4-dichlorobenzyl ester; (b) Cyanoacetic acid benzyl ester. | Do. |
| Do | (a) Cyanoacetic acid γ-phenylallyl ester; (b) Cyanoacetic acid benzyl ester. | Do. |
| Do | (a) Cyanoacetic acid γ-phenylpropyl ester; (b) Cyanoacetic acid 3,4-dichlorobenzyl ester. | Do. |
| Do | (a) Cyanoacetic acid trichlorobenzyl ester; (b) Cyanoacetic acid benzyl ester. | Do. |
| Do | (a) Cyanoacetic acid β-phenoxyethyl ester; (b) Cyanoacetic acid benzyl ester. | Do. |
| Do | (a) Cyanoacetic acid 4-nitrobenzyl ester; (b) Cyanoacetic acid benzyl ester. | Do. |
| Do | (a) Cyanoacetic acid 3,4-dichlorobenzyl ester; (b) Cyanoacetic acid 2,4,6-trichlorobenzyl ester. | Do. |
| Do | (a) Cyanoacetic acid-β-hydroxy-β-phenylethyl ester; (b) Cyanoacetic acid benzyl ester. | Do. |
| 1,3,3-trimethyl-2-methylene-indolene-ω-aldehyde | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid γ-phenylallyl ester. | Do. |
| 1,3,3-trimethyl-5-methoxy-2-methylene-indolene-ω-aldehyde | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid 3,4-dichlorobenzyl ester. | Do. |
| 1,3,3-trimethyl-5-methoxy-2-methylene-ω-cyanoindolene-ω-aldehyde | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid phenoxyethyl ester. | Do. |
| 1,3,3,5-tetramethyl-2-methylene-indolene-ω-aldehyde | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid 4-chlorobenzyl ester. | Do. |
| ,3,3,-trimethyl-5-carbamido-2-methylene-indolene-ω-aldehyde | (a) Cyanoacetic acid benzyl ester; (b) Cyanoacetic acid 2,4,6-trichlorobenzyl ester. | Do. |
| Do | (a) Cyanoacetic acid benzyl ester; (b) Cyanoacetic acid γ-phenylpropyl ester. | Do. |
| 1,3,3-trimethyl-5-nitro-2-methylene-indolene-ω-aldehyde | (a) Cyanoacetic acid benzyl ester; (b) Cyanoacetic acid γ-phenylpropyl ester. | Do. |
| 1,3,3-trimethyl-5-cyano-2-methylene-indolene-ω-aldehyde | (a) Cyanoacetic acid benzyl ester; (b) Cyanoacetic acid tetrahydrofurfuryl ester. | Do. |
| Do | (a) Cyanoacetic acid α-phenylpropyl ester; (b) Cyanoacetic acid benzyl ester. | Do. |
| 1,3,3-trimethyl-5-methylsulphonyl-2-methylene-indolene-ω-aldehyde | (a) Cyanoacetic acid benzyl ester; (b) Cyanoacetic acid phenoxyethyl ester. | Do. |
| 1,3,3-trimethyl-5-carbobenzoxy-2-methylene-indolene-ω-aldehyde | (a) Cyanoacetic acid benzyl ester; (b) Cyanoacetic acid 2-chlorobenzyl ester. | Do. |
| Do | (a) Cyanoacetic acid γ-phenylpropyl ester; (b) Cyanoacetic acid benzyl ester. | Do. |
| 1,3,3-trimethyl-5-(N-ethyl)-carbanilido-2-methylene-indolene-ω-aldehyde | (a) Cyanoacetic acid benzyl ester; (b) Cyanoacetic acid ethyl ester. | Do. |
| 1,3,3-trimethyl-5-phenylsulphonyl-2-methylene-indolene-ω-aldehyde | (a) Cyanoacetic acid benzyl ester; (b) Malonic acid dinitrile. | Do. |
| Do | (a) Cyanoacetic acid γ-phenylpropyl ester; (b) Cyanoacetic acid benzyl ester. | Do. |
| 1,3,3,7-tetramethyl-5-nitro-2-methylene-indolene-ω-aldehyde | (a) Cyanacetic acid benzyl ester; (b) Cyanoacetic acid γ-phenylpropyl ester. | Do. |
| 1,3,3,-trimethyl-5-chloro-2-methylene-indolene-ω-aldehyde | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid phenoxyethyl ester. | Do. |
| 1,3,3-trimethyl-5-ethoxy-2-methylene-indolene-ω-aldehyde | (a) Cyanacetic acid benzyl ester; (b) Cyanoacetic acid γ-phenylpropyl ester. | Do. |
| Do | (a) Cyanoacetic acid γ-phenylpropyl ester; (b) Cyanoacetic acid 3,4-dichlorobenzyl ester. | Do. |
| 1,3,3-trimethyl-5-methoxy-2-methylene-indolene-ω-aldehyde | (a) Cyanoacetic acid 4-chlorobenzyl ester; (b) Cyanoacetic acid 2-chlorobenzyl ester. | Do. |
| 1,3,3-trimethyl-7-ethyl-2-methylene-indolene-ω-aldehyde | (a) Cyanoacetic acid benzyl ester; (b) Cyanoacetic acid γ-phenylpropyl ester. | Do. |
| Do | (a) Cyanoacetic adid γ-phenylpropyl ester; (b) Cyanoacetic acid phenoxyethyl ester. | Do. |
| 1,3,3,7-tetramethyl-2-methylene-indolene-ω-aldehyde | (a) Cyanoacetic acid benzyl ester; (b) Cyanoacetic acid γ-phenylallyl ester. | Do. |
| Do | (a) Cyanoacetic acid γ-phenylpropyl ester; (b) Cyanacetic acid benzyl ester. | Do. |
| 1,3,3,5-tetramethyl-2-methylene-indolene-ω-aldehyde | (a) Cyanaocetic acid 4-chlorobenzyl ester; (b) Cyanoacetic acid hydroxyethylamide. | Do. |
| 1,3,3-trimethyl-5-amino-2-methylene-indolene-ω-aldehyde | (a) Cyanoacetic acid benzyl ester; (b) Cyanoacetic acid ethyl ester. | Do. |
| 1,3,3,7-tetramethyl-5-nitro-2-methylene-indolene-ω-aldehyde | (a) Cyanoacetic acid 4-nitrobenzyl ester; (b) Cyanoacetic acid benzyl ester. | Do. |
| 1,3,3-trimethyl-5-methoxy-2-methylene-indolene-ω-aldehyde | (a) Cyanoacetic acid 2-chlorobenzyl ester; (b) Cyanoacetic acid 3,4-dichlorobenzyl ester. | Do. |
| 1,3,3,7-tetramethyl-2-methylene-indolene-ω-aldehyde | (a) Cyanoacetic acid 2-chlorobenzyl ester; (b) Cyanoacetic acid 4-chlorobenzyl ester; | Do. |
| Do | (a) Cyanoacetic acid 3,4-dichlorobenzyl ester; (b) Cyanoacetic acid 2,4,6-trichlorobenzyl ester. | Do. |
| Do | (a) Cyanoacetic acid 2,4,6-trichlorobenzyl ester; (b) Cyanoacetic acid phenoxyethyl ester. | Do. |
| 1,3,3-trimethyl-5-methoxy-2-methylene-ω-cyanoindolene-ω-aldehyde | (a) Cyanoacetic acid 2-chlorobenzyl ester; (b) Cyanocetic acid 4-chlorobenzyl ester. | Do. |
| Do | (a) Cyanoacetic acid 4-chlorobenzyl ester; (b) Cyanoacetic acid γ-phenylpropyl ester. | Do. |
| 1,3,3-trimethyl-5-methoxy-2-methylene-indolene-ω-aldehyde | (a) Cyanoacetic acid 3,4-dichlorobenzyl ester; (b) Cyanoacetic acid 2,4,6-trichlorobenzyl ester. | Do. |

| Aldehyde component | Methylene compound | Colour shade of dyestuff mixture on polyamide fabric |
|---|---|---|
| 1,3,3-trimethyl-5-nitro-2-methylene-indolene-ω-aldehyde | (a) Cyanoacetic acid 3,4-dichlorobenzyl ester; (b) Cyanoacetic acid benzyl ester. | Do. |
| 1,3,3-trimethyl-7-ethyl-2-methylene-indolene-ω-aldehyde | (a) Cyanoacetic acid 2-chlorobenzyl ester; (b) Cyanoacetic acid 4-chlorobenzyl ester. | Do. |
| 1,3,3-trimethyl-7-ethoxy-2-methylene-indolene-ω-aldehyde | (a) Cyanoacetic acid 2-chlorobenzyl ester; (b) Cyanoacetic acid 3,4-dichlorobenzyl ester. | Do. |
| 1,3,3-trimethyl-5-methoxy-2-methylene-indolene-ω-aldehyde | (a) Cyanoacetic acid 2,4,6-trichlorobenzyl ester; (b) Cyanoacetic acid benzyl ester. | Do. |
| 1,3,3-trimethyl-5-methoxy-2-methylene-ω-cyanoindolene-ω-aldehyde. | (a) Cyanoacetic acid 2,4,6-trichlorobenzyl ester; (b) Cyanoacetic acid benzyl ester. | Do. |
| 1,3,3,5-tetramethyl-2-methylene-indolene-ω-aldehyde | (a) Cyanoacetic acid 2,4,6-trichlorobenzyl ester; (b) Cyanoacetic acid benzyl ester. | Do. |
| 1,3,3-trimethyl-5-carbo-γ-phenyl-propoxy-2-methylene-indolene-ω-aldehyde. | (a) Cyanoacetic acid benzyl ester; (b) Cyanoacetic acid phenoxyethyl ester. | Do. |
| Do | (a) Cyanoacetic acid γ-phenylpropyl ester; (b) Cyanoacetic acid benzyl ester. | Do. |
| 1,3,3,7-tetramethyl-5-chloro-2-methylene-indolene-ω-aldehyde | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid γ-phenylallyl ester. | Do. |
| 1,3,3,7-tetramethyl-4-chloro-2-methylene-indolene-ω-aldehyde | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid methyl ester. | Do. |
| 1,3,3,7-tetramethyl-6-chloro-2-methylene-indolene-ω-aldehyde | (a) Cyanoacetic acid benzyl ester; (b) Cyanoacetic acid ethyl ester. | Do. |
| Do | (a) Cyanoacetic acid γ-phenylpropyl ester; (b) Cyanoacetic acid benzyl ester. | Do. |
| 1,3,3-trimethyl-5-chloro-7-methoxy-2-methylene-indolene-ω-aldehyde. | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid ethyl ester. | Do. |
| 1,3,3-trimethyl-4-chloro-7-methoxy-2-methylene-indolene-ω-aldehyde. | (a) Cyanoacetic acid benzyl ester; (b) Cyanoacetic acid ethyl ester. | Do. |
| Do | (a) Cyanoacetic acid γ-phenylpropyl ester; (b) Cyanoacetic acid benzyl ester. | Do. |
| 1,3,3,7-tetramethyl-4-carbomethoxy-2-methylene-indolene-ω-aldehyde. | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid ethyl ester. | Do. |
| 1,3,3-trimethyl-5-methoxy-2-methylene-ω-cyanoindolene-ω-aldehyde. | (a) Cyanoacetic acid γ-phenylallyl ester; (b) Cyanoacetic acid γ-phenylpropyl ester. | Do. |
| Do | (a) Cyanoacetic acid phenoxyethyl ester; (b) Cyanoacetic acid tetrahydrofurfuryl ester. | Do. |
| 1,3,3-trimethyl-4,6-dicarbomethoxy-2-methylene-indolene-ω-aldehyde. | (a) Cyanoacetic acid benzyl ester; (b) Cyanoacetic acid ethyl ester. | Do. |
| Do | (a) Cyanoacetic acid γ-phenylpropyl ester; (b) Cyanoacetic acid benzyl ester. | Do. |
| 1,3,3-trimethyl-4,5-dichloro-7-methoxy-2-methylene-indolene-ω-aldehyde. | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid ethyl ester. | Do. |
| 1,3,3-trimethyl-5-chloro-4,7-dimethoxy-2-methylene-indolene-ω-aldehyde. | (a) Cyanoacetic acid benzyl ester; (b) Cyanoacetic acid ethyl ester. | Do. |
| Do | (a) Cyanoacetic acid γ-phenylpropyl ester; (b) Cyanoacetic acid benzyl ester. | Do. |
| 1,3,3,4-tetramethyl-5-chloro-7-methoxy-2-methylene-indolene-ω-aldehyde. | (a) Cyanoacetic acid benzyl ester; (b) Cyanoacetic acid γ-phenylpropyl ester. | Do. |
| Do | (a) Cyanoacetic acid γ-phenylpropyl ester; (b) Cyanoacetic acid ethyl ester. | Do. |
| 1,3,3-trimethyl-5-carbo-γ-phenylpropoxy-2-methylene-indolene-ω-aldehyde. | (a) Cyanoacetic acid benzyl ester; (b) Malonic acid dinitrile. | Do. |
| 1,3,3-trimethyl-5-carbomethoxy-2-methylene-indolene-ω-aldehyde | (a) Cyanoacetic acid benzyl ester; (b) Cyanoacetic acid methyl ester. | Do. |
| 1,3,3-trimethyl-5-cyano-2-methylene-indolene-ω-aldehyde | (a) Cyanoacetic acid benzyl ester; (b) Cyanoacetic acid ethyl ester. | Do. |
| 1,3,3-trimethyl-5-phenylsulphonyl-2-methylene-indolene-ω-aldehyde. | (a) Cyanoacetic acid benzyl ester; (b) Cyanoacetic acid ethyl ester. | Do. |
| 1,3,3-trimethyl-5-carbomethoxy-2-methylene-indolene-ω-aldehyde | (a) Cyanoacetic acid benzyl ester; (b) Cyanoacetic acid methyl ester. | Do. |
| Do | (a) Cyanoacetic acid benzyl ester; (b) Cyanoacetic acid cyclohexyl ester. | Do. |
| Do | (a) Cyanoacetic acid benzyl ester; (b) Cyanoacetic acid 4-methylcyclohexyl ester. | Do. |
| Do | (a) Cyanoacetic acid benzyl ester; (b) Cyanoacetic acid N-cyclohexylamide. | Do. |
| 1,3,3-trimethyl-5-cyano-2-methylene-indolene-ω-aldehyde | (a) Cyanoacetic acid benzyl ester; (b) Malonic acid dinitrile. | Do. |
| 1,3,3-trimethyl-5-carbo-γ-phenyl-propoxy-2-methylene-indolene-ω-aldehyde. | (a) Cyanoacetic acid benzyl ester; (b) Cyanoacetamide. | Do. |
| Do | (a) Cyanoacetic acid 3,4-dichlorobenzyl ester; (b) Cyanoacetic acid 2,4,6-trichlorobenzyl ester; (c) Cyanoacetic acid benzyl ester. | Do. |
| Do | (a) Cyanoacetic acid benzyl ester; (b) Cyanoacetic acid isopropyl ester. | Do. |
| Do | (a) Cyanoacetic acid benzyl ester; (b) Cyanoacetic acid isobutyl ester. | Do. |
| Do | (a) Cyanoacetic acid benzyl ester; (b) Cyanoacetic acid isoamyl ester. | Do. |
| Do | (a) Cyanoacetic acid benzyl ester; (b) Cyanoacetic acid 4-methoxy-n-butyl ester. | Do. |
| Do | (a) Cyanoacetic acid benzyl ester; (b) Cyanoacetic acid 1,3-dichloroisopropyl ester. | Do. |
| Do | (a) Cyanoacetic acid benzyl ester; (b) Cyanoacetic acid N-ethylanilide. | Do. |
| Do | (a) Cyanoacetic acid benzyl ester; (b) Cyanoacetic acid N-methylanilide. | Do. |
| Do | (a) Cyanoacetic acid benzyl ester; (b) Cyanoacetic acid tetrahydrofurfuryl ester. | Do. |
| Do | (a) Cyanoacetic acid benzyl ester; (b) Cyanoacetic acid β-chloroethyl ester. | Do. |
| Do | (a) Cyanoacetic acid benzyl ester; (b) Cyanoacetic acid β-methylaminoethyl ester. | Do. |
| Do | (a) Cyanoacetic acid benzyl ester; (b) Cyanoacetic acid β-hydroxyethyl ester. | Do. |

We claim:
1. A dyestuff of the formula:

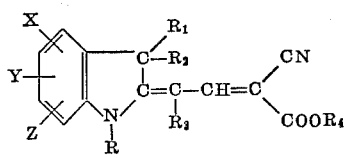

in which
R, $R_1$ and $R_2$ are methyl or ethyl;
$R_3$ is hydrogen or cyano;
$R_4$ is phenyl alkyl having 1 to 3 carbon atoms in the alkyl group, phenyl alkyl having 1 to 3 carbons in the alkyl group and having a hydroxy substituent in the alkyl group, phenyl alkyl having 1 to 3 carbon atoms in the alkyl group and substituted with chloro, nitro or methyl in the phenyl group, phenoxyethyl, or phenylallyl in which $R_4$ is linked to —O— via said alkyl or allyl group;
X is hydrogen, halogen, amino, nitro, cyano, methyl, ethyl, methoxy, ethoxy, carbonmethoxy, carbethoxy, carbophenyloxy, and carbophenyl lower alkoxy in which the lower alkoxy group contains 1–3 carbon atoms;
Y is hydrogen, halogen, methyl, ethyl, methoxy, ethoxy, carbomethoxy, carbethoxy, methyl sulfonyl, phenylsulfonyl, carboxamide, and carboxamide substituted with lower alkyl of 1 to 2 carbon atoms, phenyl or benzyl; and
Z is hydrogen, methyl, ethyl, methoxy, ethoxy or halogen.

2. A dyestuff of the formula:

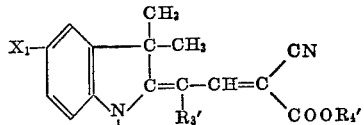

in which
$X_1$ is methoxy, ethoxy, carbomethoxy, carbethoxy or carbophenyl lower alkoxy in which the lower alkoxy group contains 1 to 3 carbon atoms;
$R_3'$ is hydrogen or cyano;
$R_4'$ is phenyl alkyl having 1 to 3 carbon atoms in the alkyl group, phenylallyl, phenoxyethyl, or phenyl alkyl having 1 to 3 carbon atoms in the alkyl group and substituted in the phenyl group with chloro, nitro or methyl.

3. A dyestuff of claim 2 wherein $X_1$ stands for —$OCH_3$ or —$COOCH_3$ and $R_3'$ stands for —CN.

4. A dyestuff of claim 2 wherein $R_4'$ stands for

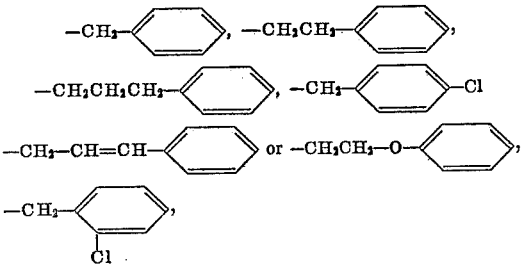

5. The dyestuff of the formula

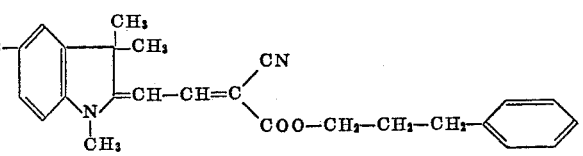

6. The dyestuff of the formula

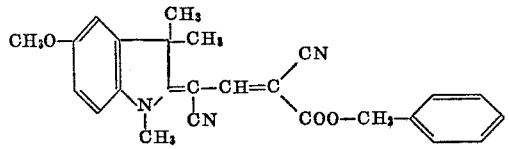

7. The dyestuff of the formula

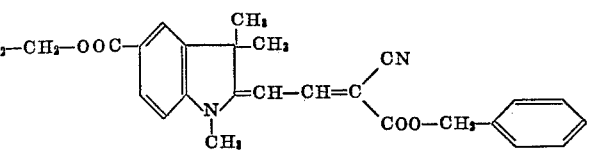

8. The dyestuff of the formula

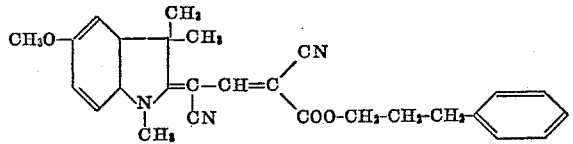

9. The dyestuff of the formula

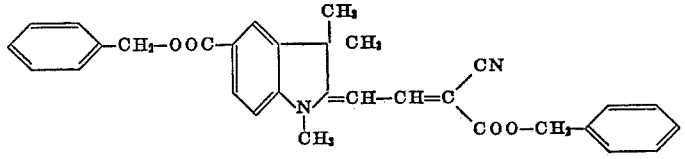

10. The dyestuff of the formula

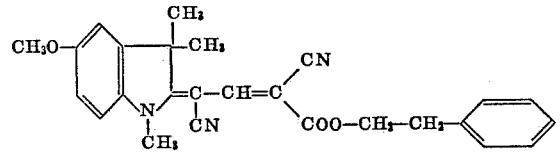

11. The dyestuff of the formula

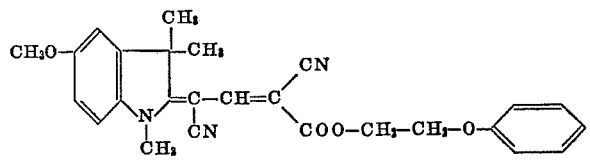

12. The dyestuff of the formula

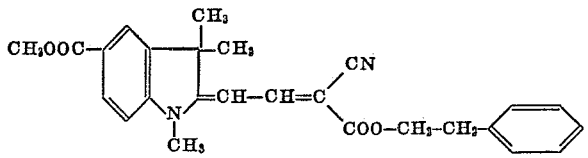

13. The dyestuff of the formula

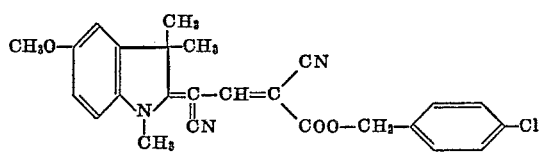

14. The dyestuff of the formula

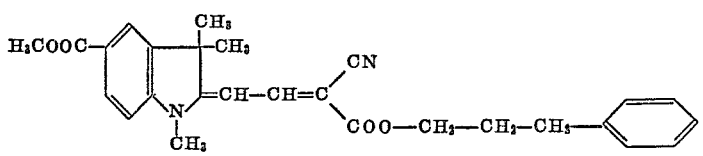

15. The dyestuff of the formula

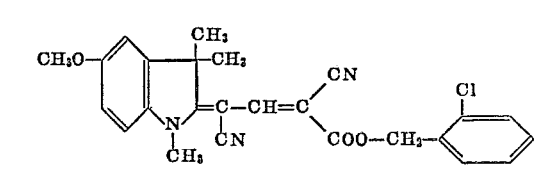

16. The dyestuff of the formula

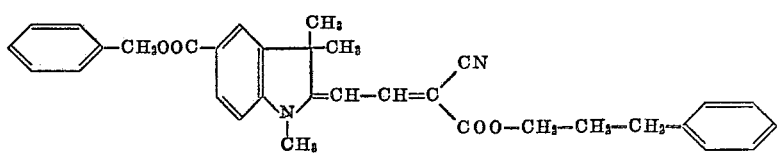

17. The dyestuff of the formula

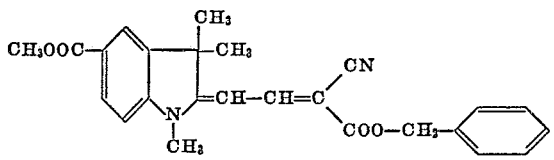

18. A dyestuff mixture containing the dyestuffs

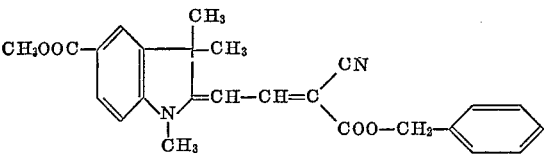

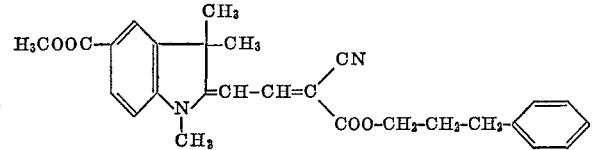

19. A dyestuff mixture containing the dyestuffs

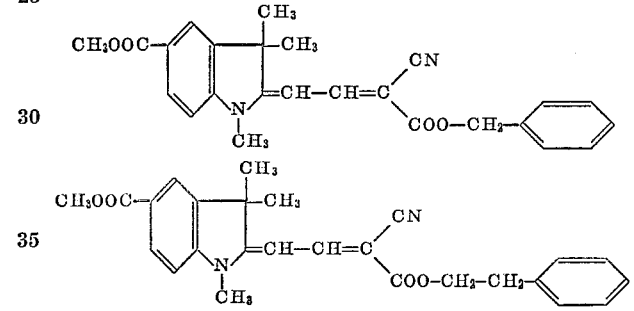

References Cited
UNITED STATES PATENTS

| | | | |
|---|---|---|---|
| 3,255,204 | 6/1966 | Raue et al. | 260—240 |
| 3,149,146 | 9/1964 | Strobel et al. | 260—240 |
| 2,693,472 | 11/1954 | Kendall et al. | 260—240 |

HENRY R. JILES, Primary Examiner
HARRY I. MOATZ, Assistant Examiner

U.S. Cl. X.R.

8—55; 260—240, 326.12, 326.13, 326.14, 326.15, 326.16, 347.4, 464, 465, 465.4